US011233533B1

(12) United States Patent
Zhao et al.

(10) Patent No.: US 11,233,533 B1
(45) Date of Patent: Jan. 25, 2022

(54) IMPULSE RADIO ULTRA WIDEBAND MULTI-ANTENNA TIME DELAY RECEIVER AND MTHOD FOR ACQUIRING ANGLE OF ARRIVAL BASED ON THE SAME

(71) Applicant: Shenzhen Giant Microelectronics Company Limited, Guangdong (CN)

(72) Inventors: Shaohua Zhao, Guangdong (CN); Jiewei Ding, Guangdong (CN); Lefeng Shen, Guangdong (CN); Weimin Zhang, Guangdong (CN)

(73) Assignee: Shenzhen Giant Microelectronics Company Limited, Shenzhen (CN)

( * ) Notice: Subject to any disclaimer, the term of this patent is extended or adjusted under 35 U.S.C. 154(b) by 0 days.

(21) Appl. No.: 17/458,535

(22) Filed: Aug. 26, 2021

(30) Foreign Application Priority Data

Aug. 16, 2021 (CN) .......................... 202110938863.3

(51) Int. Cl.
*H04B 1/10* (2006.01)
*H01Q 3/26* (2006.01)
*H04B 1/16* (2006.01)
*H04B 1/06* (2006.01)
*H01Q 5/25* (2015.01)

(52) U.S. Cl.
CPC ................. *H04B 1/06* (2013.01); *H01Q 5/25* (2015.01)

(58) Field of Classification Search
CPC .......... H01Q 3/26; H01Q 3/2605; H01Q 5/20; H01Q 5/25; H04B 1/06; H04B 1/10; H04B 1/16; H04B 1/1081
See application file for complete search history.

(56) References Cited

U.S. PATENT DOCUMENTS 10,171,129 B1 * 1/2019 Hammerschmidt ......................... H04B 1/71632
10,969,457 B2 * 4/2021 Jamin ....................... G01S 3/46
(Continued)

FOREIGN PATENT DOCUMENTS

CN          1503491 A      6/2004
CN        102073041 A      5/2011
(Continued)

OTHER PUBLICATIONS

Wen Leng, 2D AoA Estimation Based on RSS of Three Directional Antennas, Computer Engineering, May 2021, pp. 160-168 and 175, vol. 47, Issue 5.
(Continued)

*Primary Examiner* — Blane J Jackson (57) ABSTRACT

An impulse radio ultra wideband multi-antenna time delay receiver and a method for acquiring an angle of arrival based on the same are disclosed. The receiver includes M antennas, M radio frequency paths, an analog front end, an analog-digital converter and a digital processing unit, wherein each antenna is correspondingly connected with one of the radio frequency paths, output ends of all the M radio frequency paths are connected with the analog front end, an output end of the analog front end is connected with an input end of the analog-digital converter, and an output end of the analog-digital converter is connected with the digital processing unit, wherein the radio frequency path corresponding to the $m^{th}$ antenna is provided with a time delayer, $1<m\leq M$, and m and M are respectively natural numbers greater than 1.

14 Claims, 4 Drawing Sheets

(56) References Cited

U.S. PATENT DOCUMENTS

| | | | |
|---|---|---|---|
| 10,992,419 B1* | 4/2021 | Zhou | .................... H04B 7/0608 |
| 2003/0203717 A1 | 10/2003 | Chuprun et al. | |
| 2008/0252524 A1 | 10/2008 | Chu et al. | |
| 2009/0154334 A1 | 6/2009 | Lee et al. | |
| 2016/0033613 A1 | 2/2016 | Hahn et al. | |
| 2016/0033617 A1 | 2/2016 | Hahn et al. | |
| 2020/0400777 A1* | 12/2020 | Lentsch | .................... G01S 3/50 |

FOREIGN PATENT DOCUMENTS

| | | |
|---|---|---|
| CN | 104980237 A | 10/2015 |
| CN | 105391664 A | 3/2016 |
| CN | 103733085 B | 9/2016 |
| CN | 108828546 A | 11/2018 |
| CN | 111025277 A | 4/2020 |
| CN | 111948614 A | 11/2020 |
| CN | 112702136 A | 4/2021 |

OTHER PUBLICATIONS

Shao-Hua Zhao et al. Summary of Radar Remote Sensing Application in Environmental Protection, Journal of Microwaves, Feb. 2014, pp. 90-96, vol. 30, Issue 1, China Academic Journal Electronic Publishing House.

* cited by examiner

IMPULSE RADIO ULTRA WIDEBAND MULTI-ANTENNA TIME DELAY RECEIVER AND MTHOD FOR ACQUIRING ANGLE OF ARRIVAL BASED ON THE SAME

CROSS REFERENCE TO RELATED APPLICATIONS

The present application claims the priority of Chinese Patent Application No. 202110938863.3 filed on Aug. 16, 2021. The contents of the above application are hereby incorporated by reference.

TECHNICAL FIELD

The present application relates to the technical field of wireless communication, in particular to an impulse radio ultra wideband multi-antenna time delay receiver and a method for acquiring an angle of arrival based on the same.

BACKGROUND ART

An IR-UWB (Impulse Radio Ultra Wideband) system is a communication system for transmitting data by taking a narrow impulse of a non-sinusoidal wave as an information carrier, and has extremely short impulse duration about 1-2 ns and the spectral range of 3.1-10.6 GHz. The IR-UWB system is defined in detail in IEEE 802.15.4-2020 and IEEE 802.15.4 z-2020 standards. The UWB system is low in transmitting power and high in electromagnetic compatibility and stability, signals may be favorably concealed in other types of signals and environmental noise, a traditional receiver is incapable of identifying and receiving a UWB signal, and therefore, the UWB system has very high safety. The UWB system may achieve mutual ranging and data communication between two terminals/devices without depending on other wireless or wired networks. The single channel bandwidth of a UWB is greater than or equal to 499.2 MHz, and the centimeter-level ranging precision may be achieved in a ranging manner based on flight time. Meanwhile, a pseudorandom STS (scrambled timestamp sequence) based on AES-128 encryption is defined in an IEEE 802.15.4z standard, and high-precision two-dimensional and even three-dimensional angle of arrival estimation may be achieved by virtue of the STS and a plurality of antennas of the receiver, so that point-to-point ranging and positioning between two devices are achieved, and the system has very high flexibility as comparison with other communication systems. Due to the characteristics such as high ranging precision, high stability and safety, high anti-interference capacity and capability of supporting communication and ranging between two devices, the UWB system is widely applied to the fields such as indoor and outdoor short-distance wireless communication as well as wireless ranging and positioning.

At present, for a UWB receiver (such as patent documents CN 112702136 A, CN 103733085 B, CN 111025277 A and U.S. Pat. No. 10,992,419 B1) adopting multi-antenna architecture for AoA (Angle of Arrival) measurement, in order to avoid mutual aliasing and interference of time domain signals caused by a plurality of antennas with different phases, an antenna time division switching manner is adopted. An antenna selection switch is switched to a selected antenna within different time so as to ensure that only one path of effective signal enters the system within the same time. By using the antenna time division switching manner, aliasing and interference caused by simultaneous receiving of a plurality of antenna signals may be avoided, but gains brought by a plurality of antennas are lost.

The above contents in the background art are disclosed for only helping the understanding of the conception and technical solution of the present application, but do not necessarily fall within the prior art of the present parent application. The above-mentioned background art should not be used for evaluating the novelty and creativity of the present application in the case that there is no definitive evidence to suggest that the above-mentioned contents have been published on the application date of the present patent application.

SUMMARY OF THE INVENTION

For solving the above-mentioned technical problems, the present application provides an impulse radio ultra wideband multi-antenna time delay receiver and a method for acquiring an angle of arrival based on the same. According to the present application, gains brought by a plurality of antennas may be sufficiently utilized, and aliasing and interference among a plurality of antenna signals are also avoided.

For achieving the above-mentioned purpose, the present application adopts the following technical solutions.

An embodiment of the present application discloses an impulse radio ultra wideband multi-antenna time delay receiver, including M antennas, M radio frequency paths, an analog front end, an analog-digital converter and a digital processing unit; wherein each antenna is correspondingly connected with one of the radio frequency paths, output ends of all the M radio frequency paths are connected with the analog front end, an output end of the analog front end is connected with an input end of the analog-digital converter, and an output end of the analog-digital converter is connected with the digital processing unit, wherein the radio frequency path corresponding to the $m^{th}$ antenna is provided with a time delayer, $1<m \leq M$, and m and M are respectively natural numbers greater than 1.

Preferably, no time delayer exists on the radio frequency path corresponding to the first antenna.

Preferably, the predefined time delayed by the time delayer on the $m^{th}$ radio frequency path is expressed as $t_m = (m-1)\tau$, and $\tau$ is an interchannel fixed time delay.

Another embodiment of the present application discloses a method for acquiring an angle of arrival based on an impulse radio ultra wideband multi-antenna time delay receiver, including: respectively receiving radio frequency signals by M antennas of the impulse radio ultra wideband multi-antenna time delay receiver; respectively forming analog signals from the radio frequency signals through M radio frequency paths corresponding to the M antennas; aggregating and linearly adding the analog signals on all the radio frequency paths at an analog front end, and inputting the analog signals to a digital processing unit after passing through the analog front end and an analog-digital converter, wherein the radio frequency path corresponding to the $m^{th}$ antenna is provided with a time delayer to separate each analog signal in a time domain by virtue of different fixed time delays, each analog signal is acquired to calculate an angle of arrival, $1<m \leq M$, and m and M are respectively natural numbers greater than 1.

Preferably, the method specifically includes the following steps:

S1: configuring the impulse radio ultra wideband multi-antenna time delay receiver to have a plurality of sections of STS, and dividing the plurality of sections of STS into an STS front part and an STS rear part, wherein the STS front part includes at least one section of STS in the front, and the STS rear part includes at least one section of STS at the rear;

S2: determining whether a current section of STS belongs to the STS front part or the STS rear part, under the condition of the current section of STS belongs to the STS front part, performing step S3, and under the condition of the current section of STS belongs to the STS rear part, performing step S5;

S3: performing multiphase time delay search and residual frequency offset estimation in sequence;

S4: performing frequency offset compensation on all subsequent sections of STS following the current section of STS, and returning to the step S2 so as to process the next section of STS as the current section of STS; and S5: under the condition of the current section of STS is the last section of STS, performing AoA estimation by using data of the current section of STS subjected to frequency offset compensation to obtain a final AoA estimation value; and under the condition of the current section of STS is not the last section of STS, respectively performing AoA estimation by using the data of the current section of STS subjected to frequency offset compensation and data of all the sections of STS following the current section of STS subjected to frequency offset compensation, and performing weighted average on a plurality of AoA estimation results to obtain a final AoA estimation value.

Preferably, the multiphase time delay search in the step S3 includes: near the fixed time delay of each antenna, determining a time domain offset of a signal, caused by a transmission distance difference, by search in a preset sliding window so that a boundary position of a time domain impulse signal of the antenna is determined.

Preferably, the multiphase time delay search step in the step S3 specifically includes:

A1: locally generating an STS signal $v=[v_1 \ldots v_K]$, and generating a channel-equalized STS signal template $\hat{v}$ according to the locally generated STS signal, wherein K is the length of the current section of STS with a sampling point as a unit;

A2: performing cross-correlation on the signals received by the digital processing unit and the channel-equalized STS signal template to determine a time domain offset of a signal of the $m^{th}$ antenna relative to the first antenna; and A3: repeating the step A2 until time domain offsets of all the M antennas are determined.

Preferably, the step A2 specifically includes:

A21: determining the position of a search starting point as pbegin=N−(m−1)q−W/2, wherein N is the position of a start symbol boundary of an STS signal of the first antenna in a received signal buffer, (m−1)q is a preset time delay in the time delayer on the radio frequency path corresponding to the $m^{th}$ antenna when the sampling point is used as the unit, and W is the size of a search window;

A22: performing cross-correlation on the signals received by the digital processing unit and a local channel-equalized STS signal template, and storing a cross-correlation result as $c(k)=s^*\hat{v}$, wherein $s=[s(p)\ s(p+1)\ \ldots\ s(p+K-1)]$, s(p) is a signal received by the digital processing unit at the time pT, T is a sampling period of the analog-digital converter, and during initial calculation, p=pbegin, and k=1;

A23: setting that p=p+1, and k=k+1, and repeating the step A22;

A24: repeating the steps A22 to A23 until k=W;

A25: solving a point with the maximum amplitude in $c_m=[c(1) \ldots c(W)]$, calculating and recording a corresponding position $p_{max}^m$; and A26: determining a time domain offset of the signal of the $m^{th}$ antenna relative to the first antenna as $p_{max}^m-N$.

Preferably, the signal received by the digital processing unit at the time nT is expressed as:

$$s(n) = \sum_{m=1}^{M} \sum_{l=0}^{L-1} v(n-(m-1)q-1)A_{m,l}e^{j(\phi+2\pi\varepsilon nT+\psi_{m,l})}$$

wherein $v(n-(m-1)q-l)$ is a baseband signal of a transmitting end at a sampling point n−(m−1)q−l, (m−1)q is the preset time delay in the time delayer on the radio frequency path corresponding to the $m^{th}$ antenna when the sampling point is used as the unit, $A_{m,l}$ is a link gain of the $m^{th}$ antenna at a time delay l, $\emptyset$ is a starting phase difference of a transmitter and a receiver, $\varepsilon$ is a residual frequency offset between the transmitter and the receiver, and $\psi_{m,l}$ is a phase difference introduced at the time delay l due to a distance difference of the $m^{th}$ antenna relative to the first antenna.

Preferably, the step of generating the channel-equalized STS signal template $\hat{v}$ according to the locally generated STS signal specifically includes: performing convolution by using a conjugate h* of the locally generated STS signal and a channel estimation result of an STS starting position to generate the channel-equalized STS signal template $\hat{v}=v\otimes h^*$.

Preferably, the residual frequency offset estimation in the step S3 specifically includes:

B1: weighting and combining cross-correlation peaks of the plurality of antennas to obtain $c_{peak}$, and acquiring diversity gains of the plurality of antennas:

$$c_{peak} = \sum_{m=1}^{M} W_m * c_m(p_{max}^m)$$

wherein $W_m$ is the weight of the $m^{th}$ antenna;

B2: solving the residual frequency offset according to a peak phase:

$$\varepsilon = \text{angle}(c_{peak})/(\pi KT)$$

wherein angle(.) is a function for solving complex angles; and further, the step of performing frequency offset compensation on all the subsequent sections of STS following the current section of STS in the step S4 specifically includes:

adjusting a clock of the receiver by virtue of a gap among all the sections of STS according to the estimation result in the step B2, and eliminating the residual frequency offset of each subsequent section of STS signal s(n) to obtain a compensated signal s'(n):

$s'(n)=s(n)*e^{-j*2\pi\varepsilon nT}$.

Preferably, the weight $W_m$ of the $m^{th}$ antenna is in direct proportion to a peak amplitude $\|c_m(p_{max}^m)\|$ of the $m^{th}$ antenna or the weights of all the antennas are equal, or the weights of the rest antennas except the antennas of which the peak amplitudes are greater than a preset threshold are 0.

Preferably, the step of performing the AoA estimation by using the data of the STS subjected to the frequency offset compensation in the step S5 specifically includes:

C1: performing correlation on the locally generated STS signal $v=[v_1 \ldots v_K]$ and the received STS signal s'(n) subjected to frequency offset compensation to obtain a cross-correlation result:

$$R(p) = \sum_{k=1}^{K} s'(k-p)v_k, \quad p = WinStart, WinStart+1, \ldots, WinEnd$$

wherein WinStart is a starting position of a multipath search window, WinEnd is an ending position of the multipath search window, the search window is greater than a set time delay $t_M$ and covers each antenna signal, and K is the length of the current section of STS with a sampling point as a unit;

C2: searching a required propagation path position according to the cross-correlation result in the step C1 to acquire the phase of each antenna on the required propagation path; and C3: performing AoA estimation by virtue of the phase and array structure of each antenna.

Preferably, the step of searching the required propagation path position according to the cross-correlation result in the step C1 to acquire the phase of each antenna on the required propagation path specifically includes:

searching, from R(p) according to the time delay from small to large, the position of a first R(p) of which the complex amplitude is greater than a given threshold as a position $p_1$ of a direct path on the first antenna, wherein positions $p_m$ of the direct path on other antenna are expressed as:

$p_m = p_1 + (m-1)q$, m=1,2, . . . , M; and the phase of each antenna corresponding to the required propagation path is expressed as:

$\psi(m) = angle(R(p_m))$, m=1,2, . . . , M.

Further embodiment of the present application discloses a computer storage medium, wherein the computer storage medium stores a program for acquiring an angle of arrival based on an impulse radio ultra wideband multi-antenna time delay receiver, and when the program for acquiring the angle of arrival based on the impulse radio ultra wideband multi-antenna time delay receiver is executed by at least one processor, the steps of the above-mentioned method for acquiring the angle of arrival based on the impulse radio ultra wideband multi-antenna time delay receiver are implemented.

Compared with the prior art, the impulse radio ultra wideband multi-antenna time delay receiver and the method for acquiring the angle of arrival based on the same provided by the present application have the beneficial effects that a plurality of paths of antenna signals are aggregated and received at the same time, the time delayer is designed on each radio frequency path to introduce the configurable time delays, and each analog signal is separated by virtue of the different fixed time delays, so that the receiver may perform diversity reception on the time domain signals of the plurality of paths of antennas at the same time, gains brought by the plurality of antennas are sufficiently utilized, and aliasing and interference among the plurality of paths of antenna signals are also avoided.

In a preferred solution, each antenna signal is determined by multiphase time delay search, each signal is accurately positioned based on a synchronization field and an STS field in IEEE-802.15.4 and IEEE-802.15.4z, and thus, the foundation is laid for precisely acquiring an AoA. Further, the impulse radio ultra wideband multi-antenna time delay receiver is configured to have the plurality of sections of STS, remnant frequency estimation may be performed by using one or more anterior sections of STS, residual frequency offset compensation may be performed on one or more posterior sections of STS, and AoA estimation is performed by using the data of the STS subjected to frequency compensation, so that the precision of the AoA and the demodulation performance are improved. Furthermore, under the condition of the STS front part includes a plurality of sections, the multiphase time delay search as well as the remnant frequency estimation and compensation may be performed once on each section, and multiple iterations are performed, so that frequency offset errors are reduced. Under the condition of the STS rear part includes a plurality of sections, weighted average may be performed on the AoA result of each section, so that estimation errors are reduced.

DETAILED DESCRIPTION OF THE INVENTION

Implementations of the present application will be described in detail as below. It should be emphasized that the following descriptions are merely exemplary, but are not intended to limit the scope and application of the present application.

It should be noted that an element may be directly or indirectly located on another element when being referred to as "fixed to" or "arranged on" another element. An element may be directly or indirectly connected to another element when being referred to as "connected to"another element. In addition, connection is not only for the purpose of fixing, but also for the purpose of circuit/signal communication.

It should be understood that directional or positional relationships indicated by terms "length", "width", "upper", "lower", "front", "rear", "left", "right", "vertical", "horizontal", "top", "bottom", "inner", "outer" and the like are based on the accompanying drawings and are only for the purposes of facilitating the description of embodiments of the present application and simplifying the description, rather than indicating or implying that the referred apparatus or element has to have a specific direction or be constructed and operated in the specific direction so as not to be understood as limitations on the present application.

In addition, terms such as "first" and "second" may be for descriptive purposes only, and cannot be understood as indicating or implying the relative importance or implicitly indicating the number of indicated technical features. Therefore, the features defined as "first" and "second" may explicitly or implicitly include at least one of the features. In the descriptions of the embodiments of the present application, the meaning of "a plurality of" may be two or more, unless it may be specifically defined otherwise.

Figure 1:
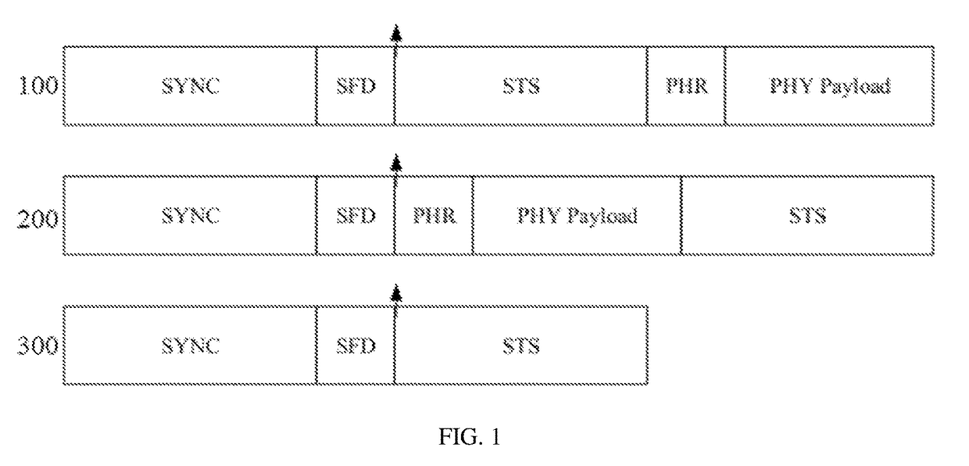
FIG. 1 is a schematic diagram showing a structure of an IEEE 802.15.4z frame.
Figure 2:
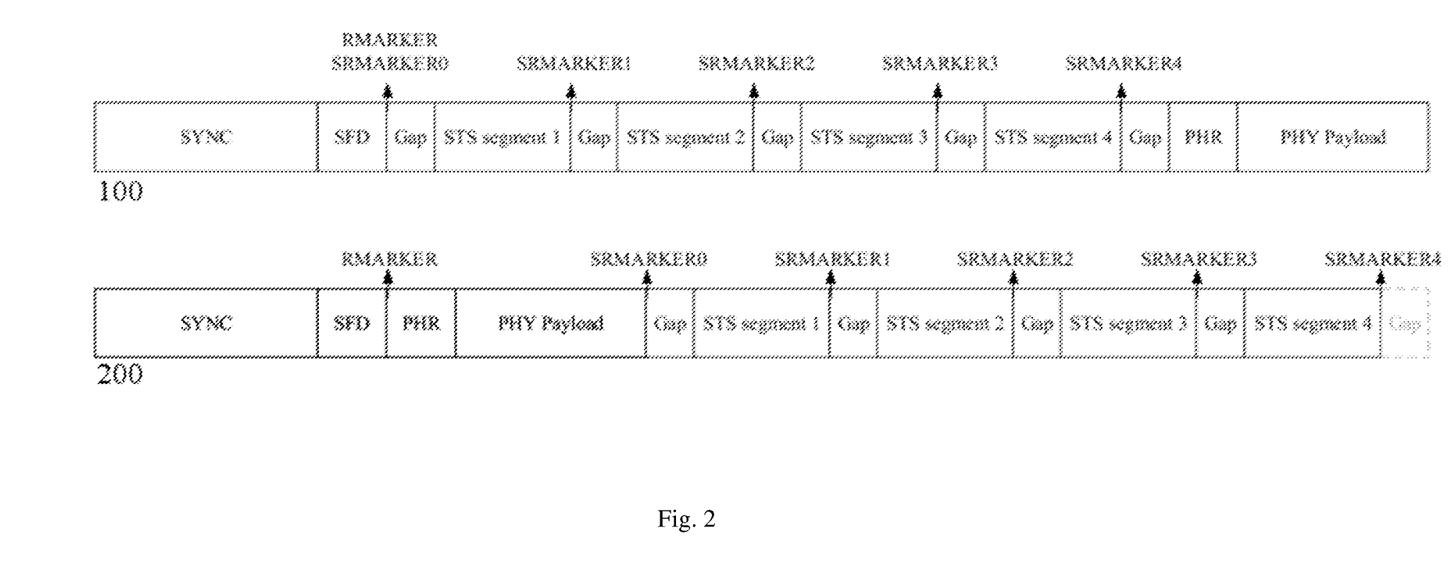
FIG. 2 is a schematic diagram showing an example of an IEEE 802.15.4z STS structure.

As shown in FIG. 1, it is defined in an IEEE 802.15.4z standard that an IR-UWB system includes a frame structure of an STS: a first STS packet format 100, a second STS packet format 200 and a third STS packet format 300. Firstly, a section of SYNC (Synchronization) signal and a SFD (Start of Frame Delimiter) signal are transmitted for transceiving synchronization; and an encrypted STS signal may be transmitted after the SFD signal is transmitted. In the case of the second STS packet format 200, the STS may be transmitted after a PHR (Physical layer HeadeR) and a PHY Payload. FIG. 2 is a further example of the STS structure. The STS signal may only have one section or be divided into a plurality of sections such as 2, 3 or 4 sections. There is a small amount of time of transmission gap before and after each section of STS, and this transmission gap may be used for configuring and adjusting a receiving channel without losing effective signals.

Figure 3:
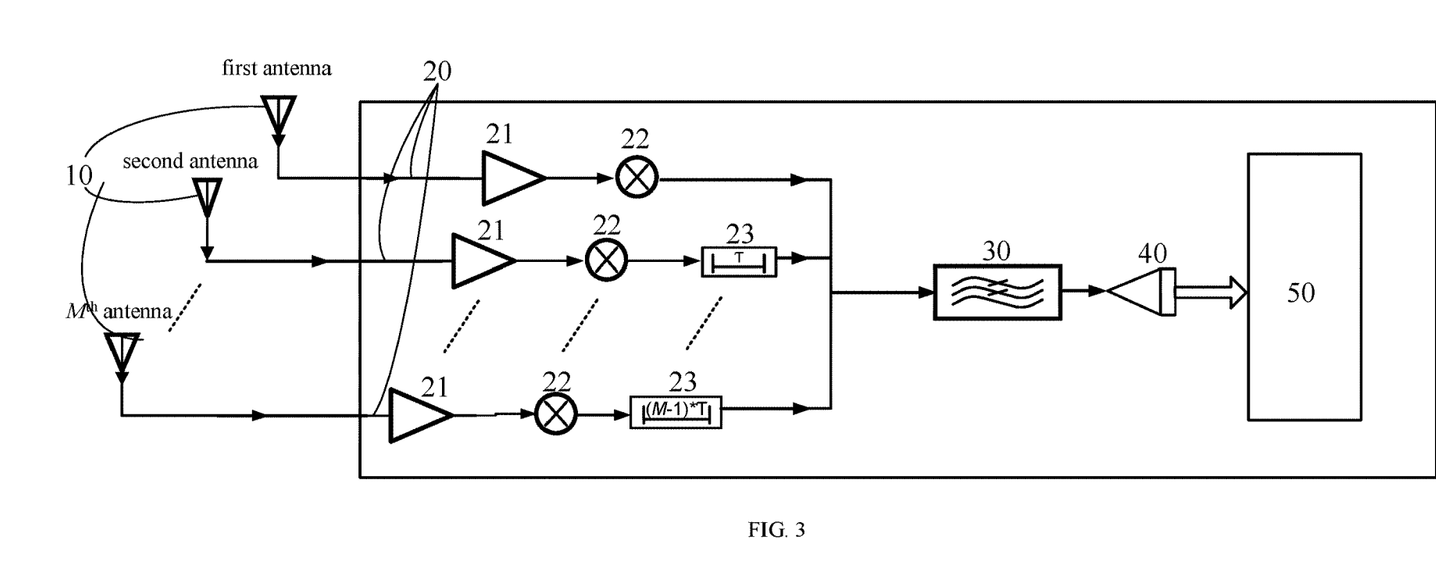
FIG. 3 is an architecture of an IR-UWB multi-antenna time delay receiver provided by a preferred embodiment of the present application.

As shown in FIG. 3 which is a schematic diagram showing a structure of an IR-UWB multi-antenna time delay receiver provided by a preferred embodiment of the present application, the receiver is designed to adopt a plurality of antennas 10 (a first antenna, a second antenna, . . . , a $M^{th}$ antenna), each antenna 10 is connected with an independent radio frequency path 20, and the radio frequency path 20 includes a low-noise amplifier 21, a frequency mixer 22 and a time delayer 23. After passing through the low-noise amplifier 21, a radio frequency signal is subjected to frequency mixing with a local clock signal in the low-noise amplifier 21 and is downconverted into a zero intermediate frequency to form an analog signal. The analog signals on all the paths are aggregated and linearly added at an analog front end 30 and are input into a digital processing unit 50 after passing through the analog front end 30 and an analog-digital converter (ADC) 40 (the analog front end 30 in the present application has an aggregation function). The received radio frequency signals reach the different antennas, time delays and phases of the analog signals on different channels differ due to different transmission distances between each antenna and a transmitting end, and the time delays may be generally much smaller than the period of a symbol; if the analog signals of the different antennas 10 are directly linearly added at the analog front end 30, the signals may be aliased to result in the loss of the demodulation performance and difficulty in measuring an AoA (Angle of Arrival). In order to solve such a problem, the present application creatively designs a multiphase time delay search algorithm in which time delayers for radio frequency paths and a digital processing unit are adopted, the time delayer 23 is designed on each radio frequency path 20, a configurable time delay is introduced to each path, and all the paths of analog signals are separated in a time domain by virtue of the different fixed time delays. By the multiphase time delay search on the digital processing unit, each path of signal is accurately determined based on a synchronization field and an STS field in IEEE-802.15.4 and IEEE-802.15.4z, and thus, precise AoA measurement may be performed.

Figure 4:
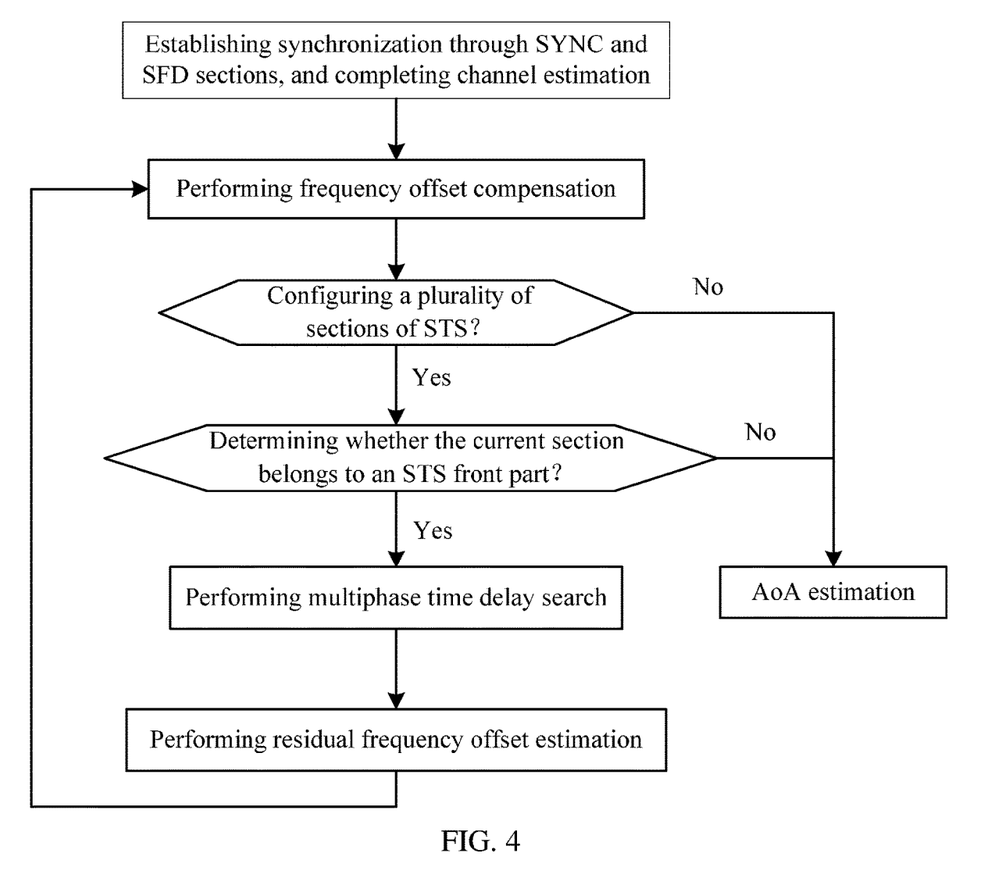
FIG. 4 is a process diagram showing overall processing of an IR-UWB multi-antenna time delay receiver provided by a preferred embodiment of the present application.

The receiver establishes synchronization through SYNC and SFD sections and completes channel estimation. After the synchronization is established, a boundary position of a time domain impulse signal of the first antenna has been determined; the synchronization establishment process does not fall within the scope of the present application, it is considered in the present application that synchronization has been established before the multiphase time delay search. Frequency offsets of a transmitter and the receiver have been estimated and compensated to a certain extent at the synchronization stage, if only one section of STS is configured in a system, this section of STS may be directly used for AoA measurement and time delay estimation. However, frequency offset estimation errors may bring additional phase angle rotation, so that the accumulation amplitude is reduced due to inconsistent phases during correlation accumulation of different sampling points in a cross-correlation process, and then, the demodulation performance and the precision of the AoA are affected; and if there are no residual frequency offsets, the phases of the correlation-accumulated sampling points are consistent, and thus, the maximum accumulation amplitude result may be achieved. Therefore, remnant frequency estimation and compensation may be further performed in the case that a plurality of sections of STS are configured. In the present application, the plurality of sections of STS are divided into an STS front part and an STS rear part based on a sectioned structure of the STS, remnant frequency estimation is performed by using the STS front part (one or more anterior sections of STS), residual frequency offset compensation is performed on the STS rear part (one or more posterior sections of STS), and AoA estimation is performed by using the data of the STS subjected to frequency compensation, so that the precision of the AoA and the demodulation performance are improved. Under the condition of the STS front part includes a plurality of sections, the multiphase time delay search as well as the remnant frequency estimation and compensation may be performed once on each section, and multiple iterations are performed, so that frequency offset errors are reduced. Under the condition of the STS rear part includes a plurality of sections, weighted average may be performed on the AoA result of each section, so that estimation errors are reduced. The processing process is shown in FIG. 4, wherein the frequency offsets of the transmitter and the receiver have been estimated and compensated to a certain extent at the synchronization stage, and therefore, frequency offset compensation may be performed once after channel estimation; and if the frequency offsets are not estimated at the synchronization stage, an initial frequency offset compensation value is 0 Hz.

In the present embodiment, the receiver has M antennas and M radio frequency paths, wherein there is no time delayer on the first radio frequency path, the predefined time delay of the time delayer on the $m^{th}$ radio frequency path may be expressed as $t_m=(m-1)\tau=(m-1)qT$, $1<m\leq M\tau$, and $\tau$ is an interchannel fixed time delay, is an integral multiple such as q times of a sampling period T of an ADC and may be flexibly configured by the digital processing unit. A signal input from the ADC to the digital processing unit at the time nT may be expressed as:

$$s(n) = \sum_{m=1}^{M} \sum_{l=0}^{L-1} v(n-(m-1)q-l)A_{m,l}e^{j(\phi+2\pi\varepsilon nT+\psi_{m,l})} \quad (1)$$

wherein $v(n-(m-1)q-l)$ is a baseband signal of a transmitting end at a sampling point $n-(m-1)q-l$, $h=[h(0) \ldots h(L-1)]$ is a discrete sampling impulse response of a channel at the interval $(0,1,\ldots,L-1)T$, $h(l)=A_{m,l}e^{j(\phi+\psi_{m,l})}$, $l=0,1,\ldots,L-1$, L is the length of a channel time delay spread sampling point; $A_{m,l}$ is a link gain of the $m^{th}$ antenna at a time delay l, $$\psi_{m,l} = \frac{d_{m,l}}{\lambda}$$

is a phase difference introduced at the time delay l due to a distance difference of the $m^{th}$ antenna relative to the first antenna;

$$\lambda = \frac{c}{f}$$

is the wavelength or a UWB carrier signal; $d_{m,l}$ is a distance difference of the $m^{th}$ antenna (m>1) and the first antenna relative to the transmitting end at the sampling point with the time delay l, and distance differences of propagation paths with different time delays and different AoAs may be different; $t_m=(m-1)\tau=(m-1)qT$ is a time delay set by a $m^{th}$ radio frequency path system, and $\tau$ is a time delay set by the system; $\emptyset$ is a starting phase difference of a transmitter and a receiver; and $\varepsilon$ is a residual frequency offset between the transmitter and the receiver. $t_m$ is a determining time delay set by the system and used for distinguishing signals received by the plurality of different antennas, $\emptyset$ is determined at a system synchronization stage, and $\varepsilon$ and $\psi_{m,l}$ are required to be further determined in the digital processing unit, and the AoA is estimated by $\psi_{m,l}$.

(1) Multiphase Time Delay Search

In each section of the one or more anterior sections of STS, the receiver may perform multiphase time delay search by using the section of stored STS signal. Near the fixed time delay of each antenna, a time domain offset of a signal, caused by a transmission distance difference, is determined by search in a preset sliding window so that a boundary position of a time domain impulse signal of the antenna is determined. The specific algorithm is described as follows.

A1: an STS signal $v=[v_1 \ldots v_K]$ is locally generated, wherein K is the length of an STS with a sampling point as a unit. Convolution is performed by using a conjugate h* of the locally generated STS signal and a channel estimation result of an STS starting position to generate a channel-equalized STS signal template $\hat{v}=v\otimes h^*$.

A2: a time domain offset of a signal of the $m^{th}$ antenna relative to the first antenna is determined, which specifically includes the following steps:

A21: the position of a search starting point is determined as pbegin=N−(m−1)q−W/2, wherein N is the position of a start symbol boundary of an STS signal of the first antenna in a received signal buffer, (m−1)q is a preset time delay in the time delayer on the $m^{th}$ antenna (which has been discretized into that the sampling point is used as the unit), and W is the size of a search window;

A22: cross-correlation is performed on the received signals and a local channel-equalized STS signal template, and a cross-correlation result is stored as $c(k)=s*\hat{v}$, wherein $s=[s(p)\ s(p+1)\ \ldots\ s(p+K-1)]$, and during initial calculation, p=pbegin, and k=1;

A23: it is set that p=p+1, and k=k+1, and the step A22 is repeated;

A24: the steps A22 to A23 are repeated until k=W;

A25: a point with the maximum amplitude in $c_m=[c(1) \ldots c(W)]$ is solved, a corresponding position $p_{max}^m$ is calculated, and the position is recorded; and A26: a time domain offset of the signal of the $m^{th}$ antenna relative to the first antenna is determined as $p_{max}^m - N$.

A3: the step A2 is repeated until time domain offsets of all the M antennas are determined.

(2) Residual Frequency Offset Estimation and Compensation

Since channel equalization has been performed in the multiphase time delay search, if there is no residual frequency offset, a peak phase of a cross-correlation result should be 0. If there is the residual frequency offset, the residual frequency offset may be embodied in the peak phase of the cross-correlation result. The residual frequency offset may be estimated according to the peak phase, and frequency offset compensation may be performed on the subsequent data. Iteration may be performed by using a plurality of sections of STS, so that the precision is improved. The specific method for residual frequency offset estimation and compensation for each section of STS is described as follows:

B1: cross-correlation peaks of the plurality of antennas are weighted and combined to obtain $c_{peak}$, and diversity gains of the plurality of antennas are acquired:

$$c_{peak} = \sum_{m=1}^{M} W_m * c_m(p_{max}^m)$$

wherein the weight $W_m$ of the $m^{th}$ antenna may be in direct proportion to a peak amplitude $\|c_m(p_{max}^m)\|$ of the $m^{th}$ antenna, and thus, the maximal-ratio combination with the optimal performance is completed, for example, $W_m=\|c_m(p_{max}^m)\|$, m=1,2, ..., M.

Or, the weights of all the antennas may be set to be equal, for example, $W_m=1$, and thus, equal-gain combination with better performance is completed.

Of course, it is possible that some of the antennas and even one antenna with the maximum peak amplitude are only taken for calculation, which is equivalent to that the weight of only one antenna is not 0, the weights of other antennas are 0. At the moment, selection combination with the minimum calculated amount is completed.

B2: the residual frequency offset is solved according to a peak phase:

$\varepsilon=\text{angle}(c_{peak})/(\pi KT)$ wherein angle(.) is a function for solving complex angles, K is the length of an STS, and T is a sampling period of an ADC.

B3: a clock of the receiver is adjusted by virtue of a gap among all the sections of STS according to the estimation result in the step B2, and the residual frequency offset of each subsequent section of STS signal s(n) is eliminated to obtain a compensated signal s'(n):

$s'(n)=s(n)*e^{-j*2\pi\varepsilon nT}$.

(3) AoA Estimation

Due to a reflection effect of wireless transmission, signals reaching a receiving end within different time delays generally have different AoAs. The AoAs may be respectively estimated for the paths with different time delays. In a positioning application, an AoA on a direct path which is not reflected has a more important application. The AoA estimation may be performed by using all the posterior sections of STS subjected to precise frequency offset compensation. The specific method for estimating a section of STS includes the steps:

C1: an STS signal $v=[v_1 \ldots v_K]$ is locally generated, wherein K is the length of an STS with a sampling point as a unit. Correlation is performed on the locally generated STS signal and the received STS signal s'(n) subjected to precise frequency offset compensation to obtain a cross-correlation result:

$$R(p) = \sum_{k=1}^{K} s'(k-p)v_k, \quad p = WinStart, WinStart+1, \ldots, WinEnd$$

wherein WinStart is a starting position of a multipath search window, WinEnd is an ending position of the multipath search window, and the multipath search window is greater than a set time delay $t_M$ and covers each antenna signal.

C2: a required propagation path position is searched to acquire the phase of each antenna on the required propagation path.

For example, under the condition of AoA estimation will be performed on a direct path with the minimum time delay, the position of a first R(p) of which the complex amplitude is greater than a given threshold is searched from R(p) according to the time delay from small to large as a position $p_1$ of the direct path on the first antenna. According to system settings, positions $p_m$ of the direct path on other antennas are expressed as:

$p_m = p_1 + (m-1)q$, $m=1,2, \ldots, M$; and the phase of each antenna corresponding to the required propagation path is expressed as:

$\psi(m) = \text{angle}(R(p_m))$, $m=1,2, \ldots, M$.

C3: a three-dimensional pitch angle of arrival and a horizontal angle are calculated by virtue of the phase and array structure of each antenna.

A preferred embodiment of the present application designs the multi-antenna time delay receiver according to which a plurality of paths of antenna signals are aggregated and received at the same time, in order to avoid aliasing and interference of the plurality of paths of signals, a multiphase time delay search algorithm in which time delayers for radio frequency paths and a digital processing unit are adopted is creatively designed, the time delayer is designed on each radio frequency path to introduce the configurable time delays, and each analog signalis separated by virtue of the different fixed time delays, and then, the signal of each antenna is determined by the multiphase time delay search of the digital processing unit. The receiver may perform diversity reception on the time domain signals of the plurality of paths of antennas at the same time, so that gains brought by the plurality of antennas are sufficiently utilized, and aliasing and interference among the plurality of paths of antenna signals are also avoided.

Another preferred embodiment of the present application further provides a computer storage medium, wherein the computer storage medium stores a program for acquiring an angle of arrival based on an impulse radio ultra wideband multi-antenna time delay receiver, and when the program for acquiring the angle of arrival based on the impulse radio ultra wideband multi-antenna time delay receiver is executed by at least one processor, the steps of the method for acquiring the angle of arrival based on the impulse radio ultra wideband multi-antenna time delay receiver in the above-mentioned technical solution are implemented.

The background section of the present application may contain background information about the problem or environment of the present application, rather than describe the prior art by others. Therefore, the contents contained in the background art are not admitted as the prior art by an applicant.

The above-mentioned contents are further detailed descriptions for the present application with reference to specific/preferred implementations, but it may not be ensured that the specific implementations of the present application are only limited to these descriptions. Those of ordinary skill in the art to which the present application belongs may further make several substitutions or modifications on these implementations which have been described without departing from the concept of the present application, and these substitutions or modifications should be considered to be within the protection scope of the present application. In the description of the present specification, reference terms "an embodiment", "some embodiments", "preferred embodiment", "example", "specific example" or "some examples" and other descriptions mean that specific features, structures, materials or characteristics described with reference to the embodiment or example are contained in at least one embodiment or example of the present application. In the present specification, the schematic representations for the above-mentioned terms are not necessarily for the same embodiment or example. Moreover, the described specific features, structures, materials or characteristics may be combined in any one or more embodiments or examples in a proper manner. In addition, the different embodiments or examples and the features of the different embodiments or examples described in the present specification may be combined by the skilled in the art without mutual conflicts. Although the embodiments and the advantages thereof in the present application have been described in detail, it should be understood that various changes, substitutions and alterations may be made herein without departing from the scope limited by the appended claims.

What is claimed is:

1. An impulse radio ultra wideband multi-antenna time delay receiver, comprising:

M antennas, M radio frequency paths, an analog front end, an analog-digital converter and a digital processing unit;

wherein each antenna is correspondingly connected with one of the radio frequency paths, output ends of all the M radio frequency paths are connected with the analog front end, an output end of the analog front end is connected with an input end of the analog-digital converter, and an output end of the analog-digital converter is connected with the digital processing unit;

wherein the radio frequency path corresponding to the $m^{th}$ antenna is provided with a time delayer, $1 < m \leq M$, and m and M are respectively natural numbers greater than 1.

2. The impulse radio ultra wideband multi-antenna time delay receiver of claim 1, wherein no time delayer exists on the radio frequency path corresponding to the first antenna.

3. The impulse radio ultra wideband multi-antenna time delay receiver of claim 1, wherein the predefined time delayed by the time delayer on the $m^{th}$ radio frequency path is expressed as $t_m = (m-1)\tau$, and $\tau$ is an interchannel fixed time delay.

4. A method for acquiring an angle of arrival based on an impulse radio ultra wideband multi-antenna time delay receiver, comprising:

respectively receiving radio frequency signals by M antennas of the impulse radio ultra wideband multi-antenna time delay receiver;

respectively forming analog signals from the radio frequency signals through M radio frequency paths corresponding to the M antennas;

aggregating and linearly adding the analog signals on all the radio frequency paths at an analog front end; and inputting the analog signals to a digital processing unit after passing through the analog front end and an analog-digital converter;

wherein the radio frequency path corresponding to the $m^{th}$ antenna is provided with a time delayer to separate each analog signal in a time domain by virtue of different fixed time delays, each analog signal is acquired to calculate an angle of arrival, 1<m≤M, and m and M are respectively natural numbers greater than 1.

5. The method of claim 4, specifically comprising the following steps:
S1: configuring the impulse radio ultra wideband multi-antenna time delay receiver to have a plurality of sections of STS, and dividing the plurality of sections of STS into an STS front part and an STS rear part, wherein the STS front part comprises at least one section of STS in the front, and the STS rear part comprises at least one section of STS at the rear;
S2: determining whether a current section of STS belongs to the STS front part or the STS rear part, under the condition of the current section of STS belongs to the STS front part, performing step S3, and under the condition of the current section of STS belongs to the STS rear part, performing step S5;
S3: performing multiphase time delay search and residual frequency offset estimation in sequence;
S4: performing frequency offset compensation on all subsequent sections of STS following the current section of STS, and returning to the step S2 so as to process the next section of STS as the current section of STS; and
S5: under the condition of the current section of STS is the last section of STS, performing AoA estimation by using data of the current section of STS subjected to frequency offset compensation to obtain a final AoA estimation value; and under the condition of the current section of STS is not the last section of STS, respectively performing AoA estimation by using the data of the current section of STS subjected to frequency offset compensation and data of all the sections of STS following the current section of STS subjected to frequency offset compensation, and performing weighted average on a plurality of AoA estimation results to obtain a final AoA estimation value.

6. The method of claim 5, wherein the multiphase time delay search in the step S3 comprises: near the fixed time delay of each antenna, determining a time domain offset of a signal, caused by a transmission distance difference, by search in a preset sliding window so that a boundary position of a time domain impulse signal of the antenna is determined.

7. The method of claim 6, wherein the multiphase time delay search in the step S3 specifically comprises:
A1: locally generating an STS signal $v=[v_1 \ldots v_K]$, and generating a channel-equalized STS signal template $\hat{v}$ according to the locally generated STS signal, wherein K is the length of the current section of STS with a sampling point as a unit;
A2: performing cross-correlation on the signals received by the digital processing unit and the channel-equalized STS signal template to determine a time domain offset of a signal of the $m^{th}$ antenna relative to the first antenna; and
A3: repeating the step A2 until time domain offsets of all the M antennas are determined.

8. The method of claim 7, wherein the step A2 specifically comprises:
A21: determining the position of a search starting point as pbegin=N−(m−1)q−W/2, wherein N is the position of a start symbol boundary of an STS signal of the first antenna in a received signal buffer, (m−1)q is a preset time delay in the time delayer on the radio frequency path corresponding to the $m^{th}$ antenna when the sampling point is used as the unit, and W is the size of a search window;
A22: performing cross-correlation on the signals received by the digital processing unit and a local channel-equalized STS signal template, and storing a cross-correlation result as $c(k)=s*\hat{v}$, wherein $s=[s(p) \ s(p+1) \ldots s(p+K-1)]$, s(p) is a signal received by the digital processing unit at the time pT, T is a sampling period of the analog-digital converter, and during initial calculation, p=pbegin, and k=1;
A23: setting that p=p+1, and k=k+1, and repeating the step A22;
A24: repeating the steps A22 to A23 until k=W;
A25: solving a point with the maximum amplitude in $c_m=[c(1) \ldots c(W)]$, calculating and recording a corresponding position $p_{max}^m$; and
A26: determining a time domain offset of the signal of the $m^{th}$ antenna relative to the first antenna as $p_{max}^m-N$.

9. The method of claim 7, wherein the signal received by the digital processing unit at the time nT is expressed as:

$$s(n) = \sum_{m=1}^{M} \sum_{l=0}^{L-1} v(n-(m-1)q-l)A_{m,l}e^{j(\phi+2\pi\varepsilon nT+\psi_{m,l})}$$

wherein v(n−(m−1)q−l) is a baseband signal of a transmitting end at a sampling point n−(m−1)q−l, (m−1)q is the preset time delay in the time delayer on the radio frequency path corresponding to the $m^{th}$ antenna when the sampling point is used as the unit, $A_{m,l}$ is a link gain of the $m^{th}$ antenna at a time delay l, $\emptyset$ is a starting phase difference of a transmitter and a receiver, ε is a residual frequency offset between the transmitter and the receiver, and $\psi_{m,l}$ is a phase difference introduced at the time delay l due to a distance difference of the $m^{th}$ antenna relative to the first antenna.

10. The method of claim 7, wherein the step of generating the channel-equalized STS signal template $\hat{v}$ according to the locally generated STS signal specifically comprises: performing convolution by using a conjugate h* of the locally generated STS signal and a channel estimation result of an STS starting position to generate the channel-equalized STS signal template $\hat{v}=v\otimes h^*$.

11. The method of claim 8, wherein the residual frequency offset estimation in the step S3 specifically comprises:
B1: weighting and combining cross-correlation peaks of the plurality of antennas to obtain $c_{peak}$, and acquiring diversity gains of the plurality of antennas:

$$c_{peak} = \sum_{m=1}^{M} W_m * c_m(p_{max}^m)$$

wherein $W_m$ is the weight of the $m^{th}$ antenna;
B2: solving the residual frequency offset according to a peak phase:

ε=angle($c_{peak}$)/(πKT)

wherein angle(.) is a function for solving complex angles; and
further, the step of performing frequency offset compensation on all the subsequent sections of STS following the current section of STS in the step S4 specifically comprises:

adjusting a clock of the receiver by virtue of a gap among all the sections of STS according to the estimation result in the step B2, and eliminating the residual frequency offset of each subsequent section of STS signal s(n) to obtain a compensated signal s'(n):

$$s'(n)=s(n)*e^{-j*2\pi\epsilon nT}.$$

12. The method of claim 11, wherein the weight $W_m$ of the $m^{th}$ antenna is in direct proportion to a peak amplitude $\|c_m(p_{max}{}^m)\|$ of the $m^{th}$ antenna or the weights of all the antennas are equal, or the weights of the rest antennas except the antennas of which the peak amplitudes are greater than a preset threshold are 0.

13. The method of claim 5, wherein the step of performing the AoA estimation by using the data of the STS subjected to the frequency offset compensation in the step S5 specifically comprises:

C1: performing correlation on the locally generated STS signal $v=[v_1 \ldots v_K]$ and the received STS signal s'(n) subjected to frequency offset compensation to obtain a cross-correlation result:

$$R(p) = \sum_{k=1}^{K} s'(k-p)v_k, \quad p = WinStart, WinStart+1, \ldots, WinEnd$$

wherein WinStart is a starting position of a multipath search window, WinEnd is an ending position of the multipath search window, the multipath search window is greater than a set time delay $t_M$ and covers each antenna signal, and K is the length of the current section of STS with a sampling point as a unit;

C2: searching a required propagation path position according to the cross-correlation result in the step C1 to acquire the phase of each antenna on the required propagation path; and C3: performing AoA estimation by virtue of the phase and array structure of each antenna.

14. The method of claim 13, wherein the step of searching the required propagation path position according to the cross-correlation result in the step C1 to acquire the phase of each antenna on the required propagation path specifically comprises:

searching, from R(p) according to the time delay from small to large, the position of a first R(p) of which the complex amplitude is greater than a given threshold as a position $p_1$ of a direct path on the first antenna, wherein positions $p_m$ of the direct path on other antennas are expressed as:

$p_m=p_1+(m-1)q$, m=1,2, . . . , M; and the phase of each antenna corresponding to the required propagation path is expressed as:

$\psi(m)=angle(R(p_m))$, m=1,2, . . . , M.

* * * * *